(12) United States Patent
Herber et al.

(10) Patent No.: US 9,849,983 B2
(45) Date of Patent: Dec. 26, 2017

(54) AERODYNAMICALLY SHAPED, ACTIVE TOWED BODY

(71) Applicant: ALFRED-WEGENER-INSTITUT, Bremerhaven (DE)

(72) Inventors: Andreas Herber, Nordholz (DE); Dirk Kalmbach, Bremerhaven (DE); Ruediger Gerdes, Loxstedt (DE); Hans-Joerg Bayer, Wettstetten (DE)

(73) Assignee: ALFRED-WEGENER-INSTITUT HELMHOLTZ-ZENTRUM FUER POLAR-UND MEERESFORSCHUNG, Bremerhaven (DE)

( * ) Notice: Subject to any disclaimer, the term of this patent is extended or adjusted under 35 U.S.C. 154(b) by 0 days.

(21) Appl. No.: 15/535,431

(22) PCT Filed: Dec. 4, 2015

(86) PCT No.: PCT/DE2015/000576
§ 371 (c)(1),
(2) Date: Jun. 13, 2017

(87) PCT Pub. No.: WO2016/095886
PCT Pub. Date: Jun. 23, 2016

(65) Prior Publication Data
US 2017/0341749 A1    Nov. 30, 2017

(30) Foreign Application Priority Data
Dec. 15, 2014   (DE) .................. 10 2014 018 857

(51) Int. Cl.
*B64D 3/02* (2006.01)
*B64C 39/02* (2006.01)
(Continued)

(52) U.S. Cl.
CPC .................. *B64D 3/02* (2013.01); *B64C 3/16* (2013.01); *B64C 39/022* (2013.01);
(Continued)

(58) Field of Classification Search
CPC .............. B64C 2201/082; B64C 39/02; B64C 2001/0045; B64C 2201/125
See application file for complete search history.

(56) References Cited

U.S. PATENT DOCUMENTS 3,669,385 A * 6/1972 Glantz ..................... B64C 1/00
                                                                    244/13
3,976,937 A    8/1976 Hearn
(Continued)

FOREIGN PATENT DOCUMENTS

DE           424378 C      1/1926
DE       19652414 A1      6/1998
(Continued)

OTHER PUBLICATIONS

Djamal Khelif ET AL: "Measurements of Air-Sea Fluxes with a Controlled Towed Vehicle (CTV) Controlled Towed Vehicle (CTV)", Mar. 22, 2010 (Mar. 22, 2010), XP055258807, Retrieved from the Internet: URL: http://www.unols.org/sites/default/files/201002scoap_09.pdf [retrieved on Mar. 16, 2016] cited in the application, the whole document.

*Primary Examiner* — Christopher P Ellis
(74) *Attorney, Agent, or Firm* — Leydig, Voit & Mayer, Ltd.

(57) ABSTRACT

An aerodynamically shaped, active towed body includes a fuselage curved along its vertical and horizontal longitudinal plane. The fuselage has a unit chamber and a load chamber. A transverse plane of the fuselage is triangular, two upper corners being located on an upper face of the fuselage and a lower corner being located on a lower face of the fuselage. Each of two wings is subdivided into a small and a large (Continued)

segment. The small segment points downwards and is attached to the fuselage in a region of the lower corner and the large segment points upwards and is attached to the small segment. Each of the small segments comprise an additional load chamber. The towed body further includes a tail fin, rudders that are each adjustable by the control device and a coupling for the towing cable.

15 Claims, 3 Drawing Sheets

(51) Int. Cl.
    *B64C 3/16*      (2006.01)
    *F41J 9/10*      (2006.01)
    *B64C 1/00*      (2006.01)

(52) U.S. Cl.
    CPC    *B64C 2001/0045* (2013.01); *B64C 2201/104* (2013.01); *B64C 2201/12* (2013.01); *B64C 2201/141* (2013.01); *B64C 2201/206* (2013.01); *F41J 9/10* (2013.01)

(56) References Cited

U.S. PATENT DOCUMENTS

| | | | |
|---|---|---|---|
| 5,186,418 A * | 2/1993 | Lauritsen | B64D 1/00 102/387 |
| 6,056,237 A * | 5/2000 | Woodland | B64C 3/40 244/120 |
| 6,144,899 A * | 11/2000 | Babb | B64C 13/18 102/384 |
| 6,392,213 B1 * | 5/2002 | Martorana | B64C 39/024 244/13 |
| 6,640,739 B2 | 11/2003 | Woodall et al. | |
| 6,765,383 B1 | 7/2004 | Barringer | |
| 7,097,137 B2 * | 8/2006 | McDonnell | B64C 25/68 244/110 C |
| 2002/0190162 A1 | 12/2002 | McDonnell | |
| 2005/0017129 A1 | 1/2005 | McDonnell | |
| 2005/0218260 A1 * | 10/2005 | Corder | B64C 3/56 244/49 |
| 2009/0134273 A1 * | 5/2009 | Page | B64C 39/024 244/63 |
| 2013/0048782 A1 | 2/2013 | Bohlen et al. | |
| 2015/0266576 A1 * | 9/2015 | Hobbart | B64C 39/024 244/2 |
| 2016/0355260 A1 | 12/2016 | Herber et al. | |
| 2016/0355261 A1 * | 12/2016 | Chin | B64D 5/00 |
| 2017/0024854 A1 * | 1/2017 | Humfeld | B64D 3/00 |

FOREIGN PATENT DOCUMENTS

| | | |
|---|---|---|
| DE | 19916145 A1 | 10/2000 |
| DE | 102010018547 A1 | 11/2011 |
| DE | 102014001873 A1 | 8/2015 |
| GB | 737318 A | 9/1955 |

* cited by examiner

Fig.5 though the wings are designed to be delta-shaped
AERODYNAMICALLY SHAPED, ACTIVE TOWED BODY

CROSS-REFERENCE TO PRIOR APPLICATIONS

This application is a U.S. National Stage Application under 35 U.S.C. §371 of International Application No. PCT/DE2015/000576 filed on Dec. 4, 2015, and claims benefit to German Patent Application No. DE 10 2014 018 857.4 filed on Dec. 15, 2014. The International Application was published in German on Jun. 23, 2016 as WO 2016/095886 A1 under PCT Article 21(2).

FIELD

The invention relates to an aerodynamically shaped, active towed body, which can be towed through the air using a towing cable by a powered aircraft.

BACKGROUND

On the one hand, towed bodies of this type are used in the military sector, where they are used for training purposes as targets or for aircraft deflection. On the other hand, towed bodies are also used in the civil sector for a variety of measurement purposes. As a general rule, there are very limited possibilities for contactless remote sensing with a powered aircraft, usually an airplane or a helicopter, in the atmospheric boundary layer up to an altitude of 300 m due to naturally occurring and artificial obstacles. In good visibility conditions (no low cloud, or no clouds at all), measurements can be performed with the airplane at an altitude of 60 m, whereas under poor visibility conditions (deep cloud, fog, rain, etc.), they can only be performed at a maximum altitude of 300 m, in other words only at the edge of the atmospheric boundary layer. High safety requirements for flight operation are imposed at altitudes of less than 150 m. However, it is often of particular interest to perform measurements immediately above the ground, for example directly over the surface of sea ice or beneath a cloud layer without any direct visual contact with the aircraft. Unmanned towed bodies are used for this purpose, which do not have their own drive systems (unlike drones), but are towed through the air by the aircraft, which flies in a non-critical altitude range in excess of 300 m in such cases. The general flight direction of the towed body is thus determined by the aircraft. In this case the towed body is connected to the aircraft via a towing cable of variable length. A distinction should be made between passive towed bodies, which do not possess any independent maneuverability, and active towed bodies, which do possess independent maneuverability in airspace—within the scope of the general flight direction determined by the aircraft.

Towed bodies for measurement purposes are used in the polar regions, for example, to obtain information about the surface of sea ice and the thickness distribution of said sea ice. However, atmospheric measurements may also be performed with such towed bodies (for example, measurements of the content of BC (black carbon), aerosol measurements (particle concentrations, chemical composition) and atmospheric trace gas measurements ($CO$, $CO_2$, $SO_2$, NOx) to obtain information about meteorological conditions and the properties of clouds, geophysical prospecting and environmental observations (emissions from ships and power plants and detection of land mines) in accessible residential or industrial areas, but also particularly inaccessible areas (polar regions, oceans, mountains, rainforests, deserts)). Measurements may take place at one altitude (towed body flight altitude) or at two altitudes synchronously (aircraft and towed body flight altitudes) inside or both inside and outside the planetary boundary layer. Furthermore, vertical measurement profiles at different flight altitudes down to just above the ground can be recorded in good visibility conditions by using a maneuverable towed body without having to change the length of the towing cable.

An active towed body for measurement purposes is known in the art from the presentation entitled "Measurements of Air-Sea Fluxes with a Controlled Towed Vehicle (CTV)" by D. Khelif et al. The presentation was published at the Ocean Sciences Meetings of the UNOLS Scientific Committee for Oceanographic Aircraft Research during the Town Hall Session in Portland, Oreg., USA, on Feb. 22, 2010 and can be downloaded online (as at Nov. 19, 2014) via the following link: <<http://www.unols.org/sites/defaultifiles/201002scoap_09.pdf>>. The CTV in the prior art relates to a partially active towed body for wireless determination of measurement data from the airspace. The towed body has a variety of sensors for determining measurement data, for example meteorological sensors (pressure and temperature sensor, hygrometer and anemometer, and sensor technology for trace gas measurements) and for determining its position in the air, for example radar-assisted altimeters, GPS system, navigation system and video camera. The towed body has two short wings, which can be rotated around a radial axis and are used to change the height of the towed body in flight. The towed body from the prior art is cylindrical and thus has an unfavorable aerodynamic design. For flight stabilization purposes, the towed body from the prior art therefore comprises a plurality of rigid wind deflectors. Furthermore, the towed body from the prior art has a computer-assisted control device which comprises an automatic flight control system for independent control of the vertical flight position (flight altitude) of the towed body. By exclusively changing the flight altitude, it is possible to fly over obstacles under control, but this must be controlled by an operator on board the towing aircraft. If a maneuvered overflight is not possible, the towed body is taken in or jettisoned, although this poses a considerable environmental hazard and generally leads to the destruction of the towed body.

GB 737318 A describes an active towed body as an aerial target for military purposes, which can be towed through the air by an aircraft by a towing cable. The towed body is designed to be aerodynamic and comprises a curved fuselage both in the vertical and in the horizontal longitudinal plane (in which the longitudinal axis x is located). This leads to a torpedo-shaped, rotationally symmetrical fuselage. The towed body also comprises two wings and a tail fin on its tail. In this case, the wings are designed to be delta-shaped when viewed from above and run completely flat in terms of their cross section. The wings are arranged at right angles to the fuselage and halfway up the fuselage (in towing mode they are therefore aligned horizontally during straight flight). When viewed from above, the wings are arranged in the rear section of the fuselage. The towed body from the prior art is active, i.e. designed such that it can be maneuvered and can be steered in all three spatial directions. In addition, the wings comprise rotatable wing tips (corresponding to ailerons), by means of which a curve inclination of the towed body can be achieved. Elevators are also integrated in the wings and a rudder is integrated in the tail fin. All rudders are controlled by a control device which is arranged in a unit chamber in the fuselage. The control device is operated manually from the aircraft, remote controlled by a base station or by autopilot from the towed body, said autopilot serving to stabilize the position of the towed body in towing mode. Furthermore, the power supply for the towed body is located in the unit chamber in the form of accumulators. The unit chamber of the towed body from the prior art is manufactured from solid material and comprises corresponding recesses for the control device and the power supply. The fuselage also comprises a load chamber, which is completely filled by a parachute. The towing cable is attached to a coupling on a jettisonable nose section of the towed body. The towed body can be decoupled from the aircraft by jettisoning the nose section. The towed body has gliding properties due to its aerodynamic shape and can be landed with the aid of the parachute.

DE 424 378 A and DE 196 52 414 A1 also disclose means of bending the wings to stabilize an aircraft. In these cases, however, the wings are arranged on the side of or above the fuselage and are initially bent upwards. The displacement effect as a result of the air flowing upwards along the sides of the wings increases the stability of the aircraft, but also results in lower lift. U.S. Pat. No. 6,640,739 B2 discloses a device for remote underwater exploration, which is suspended beneath an aircraft as a load for transportation purposes, said device being designed aerodynamically in such a way that it glides downwards after decoupling from the aircraft, supported by a parachute in this process, and lands intact on the water in which it is then submerged. In this case, however, the exploration device has a simple cylindrical form and two straight wings placed on its upper face. US 2002/0190162 A1 discloses a towed body for measurement purposes, said towed body comprising a fuselage which is curved in its horizontal and vertical longitudinal planes. In this case, however, the towed body is designed to be passive and does not have any independent maneuverability. The towed body known in the art from U.S. Pat. No. 6,765,383 B1 for measurement purposes is also passive and is designed with a double curved fuselage and has a nose boom in which various measuring instruments or their sensors are arranged. DE 199 16 145 A1 discloses a system in which the aerofoils of an aircraft for increasing lift and stabilizing flight behavior are each composed of a plurality of segments. In this case, however, it relates to flow chambers which are open at the bottom and with a narrowing cross-section.

The earlier patent application DE 10 2014 001 873 A1 is also concerned with a maneuverable, active towed body for scientific and commercial measurement purposes and is based on the CTV described above. In contrast, in the towed body described in the earlier application, full maneuverability is achieved in the entire airspace. Automated, independent circumnavigation of detected obstacles already represents a relevant safety aspect in the towed body claimed in the earlier application, taking the pressure off the aircraft pilot to a significant extent. However, in the earlier application, the emphasis is not on the aerodynamic design of the towed body with optimized load holding, but on the ability to reliably switch the towed body to a neutral flight position by means of an electromechanical malfunction module in the event of a fault or failure of the control electronics so that it can be safely recovered by the aircraft. The present invention relates to different aspects to the earlier application, but DE 10 2014 001 873 A1 is hereby incorporated by reference with regard to other general matters.

SUMMARY

In an embodiment, the present invention provides an aerodynamically shaped, active towed body, which is towable through the air using a towing cable by a powered aircraft, including a fuselage curved along its vertical and horizontal longitudinal plane. The fuselage has a unit chamber and a load chamber. A transverse plane of the fuselage is triangular, two upper corners being located on an upper face of the fuselage and a lower corner being located on a lower face of the fuselage. The vertical longitudinal plane of the fuselage is only curved on the upper face and runs straight on the lower face. At least one power supply and one control device are disposed in the unit chamber. Two wings are arranged at a rear region of the fuselage. Each of the two wings is subdivided into a small and a large segment. The small segment points downwards and is attached to the fuselage in a region of the lower corner and the large segment points upwards and is attached to the small segment. Each of the small segments comprise an additional load chamber. The towed body further includes a tail fin, rudders that are each adjustable by the control device and a coupling for the towing cable.

BRIEF DESCRIPTION OF THE DRAWINGS

The present invention will be described in even greater detail below based on the exemplary figures, which are schematic in nature and not to scale. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

From the generic towed body of GB 737 318 A, an embodiment of the present invention further develops said generic towed body such that it can be used for scientific and commercial measurement purposes and can easily be loaded with a large and variable load, specifically in the form of measuring instruments with associated sensor technology. However, in so doing, it retains, or even improves on, its full maneuverability in airspace and its aerodynamic properties. Furthermore, the towed body according to an embodiment of the invention is also able to glide in straight flight despite its load and is able to be landed safely in the decoupled state.

The towed body according to an embodiment of the invention is characterized in that the transverse plane of the fuselage is designed to be triangular, two upper corners being located on the upper face of the fuselage and a lower corner being located on the lower face of the fuselage, and the vertical longitudinal plane of the fuselage only being curved on the upper face and running straight on the lower face, and each of the two wings being subdivided into a small and a large segment, the small segment pointing downwards and being connected to the fuselage in the region of the lower corner and the large segment pointing upwards and being connected to the small segment and each small segment comprising an additional load chamber.

The fuselage of the towed body according to an embodiment of the invention is designed to be particularly aerodynamic. It is curved symmetrically in its horizontal longitudinal plane. However, in its vertical longitudinal plane, it is only curved on its upper face, whereas its lower face runs straight. This leads to a flow-optimized shape which is particularly advantageous for lift, but which also provides a convenient inner chamber for accommodating loads. Furthermore, given the triangular shape of the transverse plane of the fuselage of the towed body, the upper face of the fuselage is designed to be broad and the lower face of the fuselage is designed to be narrow. Loads can easily be placed in the fuselage both from above and from the side. The loads placed in the fuselage can easily be seen from above. The triangular cross-sectional shape of the fuselage also ensures good self-holding of the incorporated load, as the load is aligned with the lowest point of the fuselage in a self-centering manner. There is no possibility of loads slipping in towing mode.

The wings of the towed body according to an embodiment of the invention are in contact with the sides of the lower region of the fuselage, or in other words the narrow region of the fuselage on its lower face. As a result, the wing length is longer than a wing coming into contact with the sides in the middle of a bulging fuselage, but does not increase the span between the wing tips. In turn, as a result, the flight properties of the towed body are improved with no deterioration in ease of handling. Each wing is subdivided into two sections and consists of a small segment and a large segment. The small segments point downwards, or in other words are aligned downwards. In the chamber located beneath said segments and beneath the fuselage, an air cushion is formed in flight which supports and stabilizes the towed body. The large segments of the wings adjacent to the small segments point upwards, or in other words are directed upwards, with the result that air can flow above them. This further increases the stability of the towed body due to the resulting displacement effect. In this case, the words "pointing downwards" (directed downwards) refer to the region beneath the towed body and the words "pointing upwards" (directed upwards) refer to the region above the towed body, when said towed body is in its active orientation in towing mode. The angles of incidence of the small and large segments are different, and in particular, the small segments are able to point downwards at a flatter angle than the large segments point upwards. The small segments of the wings are designed to be thicker than the large segments, which are designed to be narrow and taper to a point. By designing the small segments to be thicker, this provides space for additional loads in the form of wider load chambers in the wings. This therefore further increases the total payload of the towed body, which is now composed of the payload in the load chamber in the fuselage and the payload in the additional load chambers in the small segments in the wings.

Preferably and advantageously, in the towed body according to an embodiment of the invention, it is proposed that a rudder should be arranged in each wing to provide position control around the longitudinal axis (x-axis) and the transverse axis (y-axis) of the towed body, and a rudder should be arranged in the tail fin to provide position control around the vertical axis (z-axis) of the towed body. The rudders are incorporated in the wings as wing flaps. Pivoting movements in the third spatial axis (z-axis) are achieved in the claimed towed body by means of the rudder in the tail fin. In total, this leads to a V-shaped tail unit with only two rudders. The towed body according to an embodiment of the invention is fully maneuverable in airspace and can in particular avoid obstacles independently or by remote control. For this purpose, it is advantageous and preferable if the control device comprises an autopilot control device and a manual control device, the autopilot control device also comprising a position-stabilizing gyroscope system and an anti-collision module. The claimed towed body can avoid obstacles independently as a result of the autopilot control device. This is particularly advantageous if the operators in the towing aircraft do not have any direct visual contact with the towed body, for example, if the aircraft is flying above the cloud cover and the towed body is flying beneath the cloud cover, or if the distance between the aircraft and the towed body is very large. An anti-collision module is used to enable the towed body to avoid obstacles independently, said module detecting obstacles by means of forward-facing measurement sensors, transmitting this data to the autopilot control device, which in turn converts this data to corresponding control commands for the rudders. As a result, it is possible to safely guarantee optimum avoidance of obstacles by the towed body by combining changes of its vertical and lateral flight position. In particular, this makes it possible to fly very low over the ground in the vicinity of obstacles (5 m-10 m above the surface). Accurate positionability of the towed body with respect to the ground means that it can also be used at flight altitudes with specific wind types, in low cloud and over complex terrain, in which there would otherwise be strict requirements or in which operations involving a towed body have not been possible to date.

In order to obtain measurement data, it is important to stabilize the flight of the towed body to obtain precise information concerning the respective flight position of the towed body in relation to the measurement data or to perform measurements requiring a constant distance between the towed body and the aircraft (remote infrared spectroscopy, for example). The claimed towed body therefore has a gyroscope system (gyrometer system), data from which allows the autopilot control device to stabilize the flight position of the towed body constantly by controlling the rudders. Oscillating movements of the towed body during towing, and also during hoisting and veering, can be immediately compensated by the gyroscope system, which can be designed as a redundant part to increase safety. The towed body remains in a stable flight position during straight flight and does not roll from side to side. However, the gyroscope system can also be manually overridden in this case. The proportion of automatic and manual control can be adjusted. The towed body can be maneuvered by means of the manual control device, such as, for example, to bring about precise changes in the altitude of the towed body to measure elevation profiles or to position the towed body exactly in relation to an object, for example, such as the exhaust gas cloud from a cargo or cruise ship, for example. Communication between the aircraft and the towed body is preferably achieved by means of a wireless radio connection. During manual maneuvers, the crew on board the aircraft may, for example, be equipped with 3D goggles and a forward-facing video system (first person view). An operator can see the view from his aircraft and from or onto the towed body alternately or at the same time through the 3D goggles, and then communicate accordingly with the pilot to control the aircraft and the towed body.

The towed body according to an embodiment of the invention is not intended for military purposes and its main field of application is in the measurement technology sector. In this case, it is maneuvered by means of the towing cable and/or controlled remotely by the aircraft or remotely from the ground or independently. Measurement data is required both for subsequent evaluation and for the current flight operation. For this purpose, the claimed towed body must be able to receive relatively large loads in the form of a wide variety of measurement instruments. For commercial purposes, it is also particularly important to ensure that the loads are easy to load and remove. It is therefore preferable and advantageous if the wings and the unit chamber are arranged in the rear region of the towed body and the load chambers are arranged in the middle and front region of the towed body. The unit chamber receives loads which are permanently on board the towed body and which are used to maneuver and supply said towed body and to supply the measuring instruments. These loads do, admittedly, also need to be maintained, but as a general rule they remain in the towed body whenever it is used. For this reason, they may be arranged in a less accessible position in the towed body. On the other hand, the variable payloads should be substantially unobstructed and they should be particularly easy to access. For this reason, the load chamber in the claimed towed body is located in the middle and front part of the fuselage, which is more readily accessible. The other load chambers in the small segments of the wings are also easily accessible.

This favorable distribution of load and unit chambers makes the towed body according to an embodiment of the invention particularly user-friendly. User-friendliness is improved still further if the load chamber in the fuselage preferably and advantageously comprises segment chambers that can be removed individually removed, said segment chambers being able to be loaded with variable payloads. The segment chambers can be pre-equipped by the users and then simply installed in and removed from the towed body. A modular system with segment chambers with different measurement equipment, which can be selected and combined as required, is feasible. The segment chambers can simply be designed as cuboids. However, their outer contour may also be adapted to the triangular fuselage, thus resulting in secure fixing and optimum utilization of space in the fuselage. In this case, it is particularly advantageous and preferable if the upper corners and the lower corner of the fuselage are rounded. This leads to a continuous triangular shape in the transverse plane, which is externally particularly aerodynamic and internally particularly load-friendly. Dead spaces due to sharp corners can therefore be avoided. Disruptive turbulence vortices on the outer skin of the fuselage can also be avoided.

With a view to optimum utilization of space in the towed body, it is also preferable and advantageous if the coupling for the towing cable is arranged in the middle of the fuselage and if a nose boom is arranged in the tip of the fuselage, at least one measurement instrument and/or a transmission and receiving device used to provide the wireless connection to the powered aircraft, and/or to a ground or water-based receiving and transmitting station, being accommodated in said nose boom. Having the coupling in the middle increases the maneuverability of the towed body still further compared to a towed body towed by the nose. The nose of the towed body is simultaneously free to attach and accommodate additional measuring instruments. The nose boom located upstream of the nose tip extends uncovered and freely into airspace and is therefore easy to use for wide-ranging observations and measurements and for radio communications and data transfer. The load chamber located at the front of the fuselage in the claimed towed body is thus extended beyond the nose of the towed body. The transmission and receiving devices can be used for direct transmission of measurement data to various stations, but also to enable the towed body to be remotely controlled from various stations. The transmission channels can be used in both directions (bidirectional).

Particular advantages of the claimed towed body are its large load-receiving capacity and advantageous load arrangement and segmentation, which do not, however, reduce the particularly good aerodynamic flight properties, and in particular the gliding flight properties of the towed body due to the specific design of the fuselage and the wings. Due to the main field of application, in other words using measurement technology in all variations, it is advantageous and preferable if a variety of measuring instruments are arranged in the load chamber in the fuselage and in the additional load chambers in the small segments of each wing. The large load chamber in the fuselage is particularly suited to heavier measuring instruments, which do not necessarily require the forward-facing flight direction of the towed body, as is the case with image recording systems, for example. The other load chambers in the small segments of the wings have a forward-facing position. They are therefore particularly suited to receiving forward-facing measuring instruments, which are required to detect obstacles, or measuring instruments that perform measurements on the air flow during towing. In the additional load chambers in the small segments, gas and/or aerosol inlet nozzles for measuring instruments may therefore be particularly advantageously arranged to carry out trace gas or particle measurements, for example.

As already described above, measurements are recorded for current or subsequent evaluation for scientific or commercial purposes and for current maneuvers in towing mode by using the claimed towed body. It is therefore preferable and advantageous if some of the measuring instruments are used for maneuvering and stabilizing the towed body, in particular detecting obstacles in towing mode, and if some of the measuring instruments are used to obtain measurement data for research-oriented and/or commercial purposes. In this case, it is preferable and advantageous if the measuring instruments comprise at least one forward-facing infrared camera system, a video camera system, a laser-assisted distance measurement system (to ensure minimum distances from the towed body at the front and at the rear), a radar-assisted altitude measurement system, a satellite-assisted positioning system and/or a measurement system for meteorological parameters such as temperature, humidity and wind. These systems guarantee that the towed body can be reliably positioned under all weather conditions. A pivotable video camera in the aircraft represents a further safety aspect. This can, in particular, monitor the towed body and display said body on a monitor that can be seen clearly by the pilot in the aircraft. The towed body can be monitored in both external and internal views from the aircraft or from other stations in conjunction with FPV.

The unit chamber in the claimed towed body specifically holds the control devices required in towing mode, whereas the load chamber is particularly reserved for measuring instruments for research and investigation purposes. The power supply for the various measuring instruments and control devices on board comprises accumulators and a generator to charge the accumulators in towing mode. The accumulators, which may advantageously be powerful lithium polymer accumulators with a long service life, are preferably arranged in the unit chamber. The generator may preferably and advantageously be designed as a brushless generator with an external rotor designed in the form of a folding propeller arranged on the tail of the fuselage, the propeller being driven by the air flow in towing mode. In this case, the generator is advantageously arranged at the end of the fuselage in which the unit chamber is also located in the claimed towing body.

Finally, it is also advantageous and preferable if an emergency parachute system is arranged in the fuselage of the towed body. In the event of the towed body being disconnected from the towing aircraft, an emergency parachute is activated and assists with automatic or manual rescues. As a result, it is possible to guarantee a safe landing of the towed body, which already has particularly good gliding capability, and thus minimize the risks to individuals on the ground. It is thus possible to prevent personal injury and damage, especially damage to the sensitive measurement cargo, or even the loss of the entire towed body. The towed body is usually only disconnected from the aircraft in an emergency, if, for example, it is no longer possible to fly around an obstacle that has suddenly appeared or if essential functions in the towed body or the entire power supply have failed. The emergency parachute system may be arranged in both the unit chamber at the rear end of the fuselage and in the load chamber in the front or middle part of the fuselage or in the additional load chamber in the small segments of the wings of the towed body. It then has a correspondingly positioned ejection opening.

The towed body according to an embodiment of the invention can also be appropriately referred to using the acronym "MANTAS", meaning "maneuverable active new towed atmospheric system" and has the following properties at the very least:

The towing cable can be up to 4000 m long.

Power is supplied by means of lithium polymer accumulators.

The brushless generator for charging the accumulators can be driven by a folding propeller as an external rotor on the tail of the fuselage; charging mode during towing is possible.

MANTAS is controlled around its longitudinal and transverse axes (x, y) by means of wing flaps, and around its vertical axis (z) by means of a rudder on the tail fin.

It is maneuvered by means of servo motors which can be controlled by a separate gyroscope system. Inherently stable straight flight of the towed body is guaranteed.

MANTAS can also be maneuvered from the towing aircraft, for example by FPV (first person view) with a camera system (3D goggles).

MANTAS has an active flight control system and uses sensor technology to ensure full maneuverability and obstacle detection with avoidance function (FLIR thermal imaging camera, video, laser range finder).

It uses an emergency parachute system to allow the towed body to be rescued in the event of a malfunction if the towed body needs to be disconnected from the aircraft.

MANTAS can carry a variable payload including a complete meteorological sensor package due to its segmented load chamber.

As a result of these properties, MANTAS has a range of special advantages:

The special aerodynamic design of the fuselage and wings means that MANTAS can generate considerable inherent lift and is able to glide.

MANTAS displays inherently stable straight flight qualities at pre-defined altitudes and is not affected by external interference.

MANTAS is able to execute safe operations on the surface (10 m above the ground).

MANTAS allows measurements to be performed in poor visibility conditions (fog, low cloud).

MANTAS makes it possible to carry out exact measurements in parallel with the aircraft at two altitudes and also in the air column between the aircraft and MANTAS due to the constant stabilized distance between the aircraft and MANTAS (cuvette measurement).

MANTAS is able to scan small-scale areas three-dimensionally as an active towed body by means of active positioning.

MANTAS operates with obstacle detection and automatic avoidance function which is only limited by the length of the towing cable. Its inherent maneuverability prevents collisions and allows data to be recorded over difficult terrain.

MANTAS has a high load capacity and distributes units, measuring instruments and other loads in an optimum manner between the fuselage and the wings. User-friendly load segmentation is possible.

Possible fields of application for MANTAS include the following by way of example:

ship emission measurements (short-lived climate forcing pollutants) and measurements of other emissions, e.g. methane turbulence measurements in the planetary boundary layer with respect to the interaction between the ocean, sea ice and the atmosphere.

Profile measurements for trace gases, aerosols and hydrocarbons.

Simultaneous measurements inside and outside the boundary layer.

Measurements in regions which are inaccessible or only accessible with difficulty, e.g. over sea ice, in coastal regions and investigations on orographic or volcanic clouds.

Commercial applications such as measuring exhaust gas clouds from industrial accidents, measuring radiation as a result of nuclear accidents, detecting land mines, search and rescue operations over complex terrain, detection of local sea pollution, exploration of oil and gas deposits.

Figure 1:
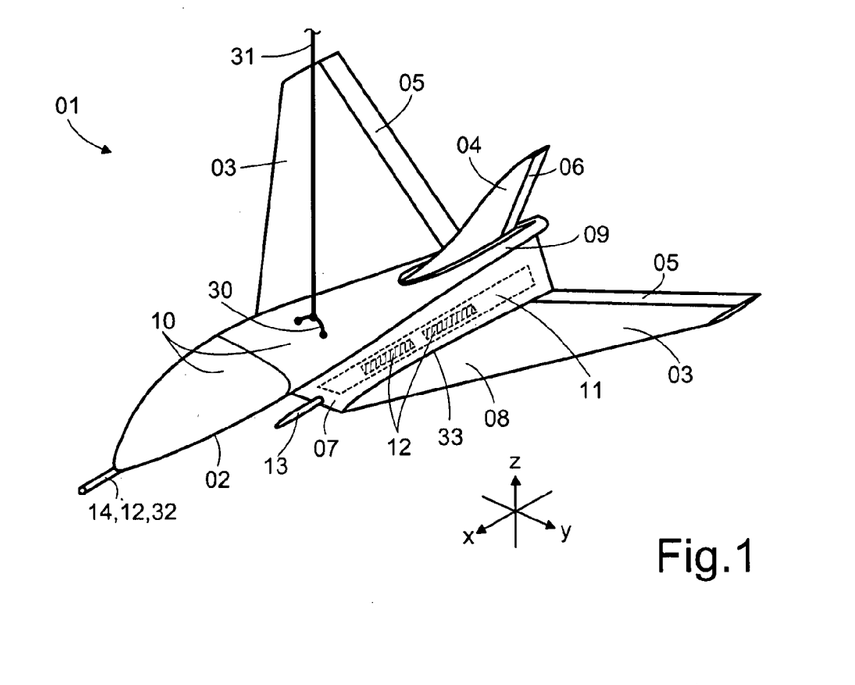
FIG. 1 is a perspective overview of the towed body.

FIG. 1 is a perspective view of a towed body 01 according to an embodiment of the invention, showing its active and aerodynamically shaped design (Cartesian coordinates system x: longitudinal axis, y: transverse axis, z: vertical axis). The towed body 01 comprises a fuselage 02, two delta-shaped wings 03 when viewed from above, and a tail fin 04. The fuselage 02 may consist of a plastics material, for example carbon fiber-reinforced plastics, but may also consist of a lightweight metal material. The drawing illustrates a rudder 05 on each wing 03 for position control around the longitudinal axis x and the transverse axis y of the towed body 01 and a rudder 06 on the tail fin 04 for position control around the vertical axis z of the towed body 01. The wings 03 are each subdivided into a small segment 07 and a large segment 08. The small segment 07 and the large segment 08 are arranged at an angle to each other such as to create a bending line 33; further embodiments will be evident from the description of FIG. 2. Furthermore, a unit chamber 09 is provided in the rear region of the fuselage 02 and a load chamber 10 is provided in the middle and front region of the fuselage 02.

Moreover, an additional load chamber 11 is located in the small segments 07 of the wings 03. Various measuring instruments 12 are located in the additional load chamber 11. Trace gas and/or aerosol inlet nozzles 13 (on the left and right sides of the fuselage respectively), leading to the measuring instruments 12 for trace gas or aerosol measurements, are illustrated on the left and right on the front face of the small segment 07. In addition, the towed body 01 comprises a nose boom 14, in which measuring instruments 12 and/or transmission and receiving devices 32 are also located. A detachable coupling 30 for a towing cable 31 can also be seen arranged in the center in FIG. 1.

Figure 2:
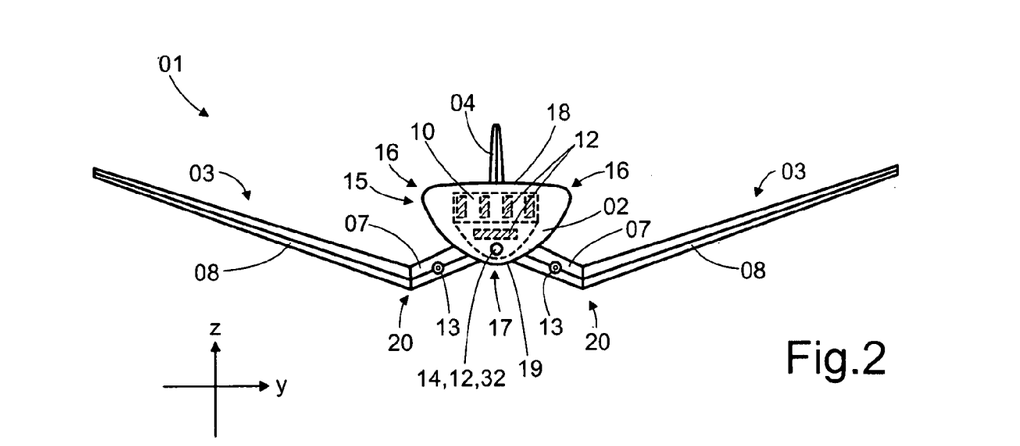
FIG. 2 is a front view of the towed body.

FIG. 2 is a front view of the towed body 01. In this view, the triangular transverse plane 15 (y-z plane) of the fuselage 02 can be seen with its two upper corners 16 and its lower corner 17. Rounded corners 16, 17 are shown. A wide upper face 18 of the fuselage 02 is created between the two upper corners 16. A tapered lower face 19 is formed in the region of the lower corner 17. In the region of the lower corner 17, the two small segments 07 of the wings 03 are arranged such that they point downwards. The large segments 08 of the wings 03 point upwards and are attached to the small segments 07. An aerodynamically favorable bend 20 is formed in each wing 03. The small segments 07 and the large segments 08 are arranged at different angles in this case. The small segments 07 point downwards at a flatter angle than the large segments 08 incline upwards. The trace gas and/or aerosol nozzles 13, nose boom 14 and the tail fin 04 are also illustrated. The load chamber 10, shown as a rectangular design and adapted to the transverse plane 15 of the fuselage 02 in the illustrated embodiment, is also shown. The load chamber 10 is loaded with measuring instruments 12.

Figures 3, 4:
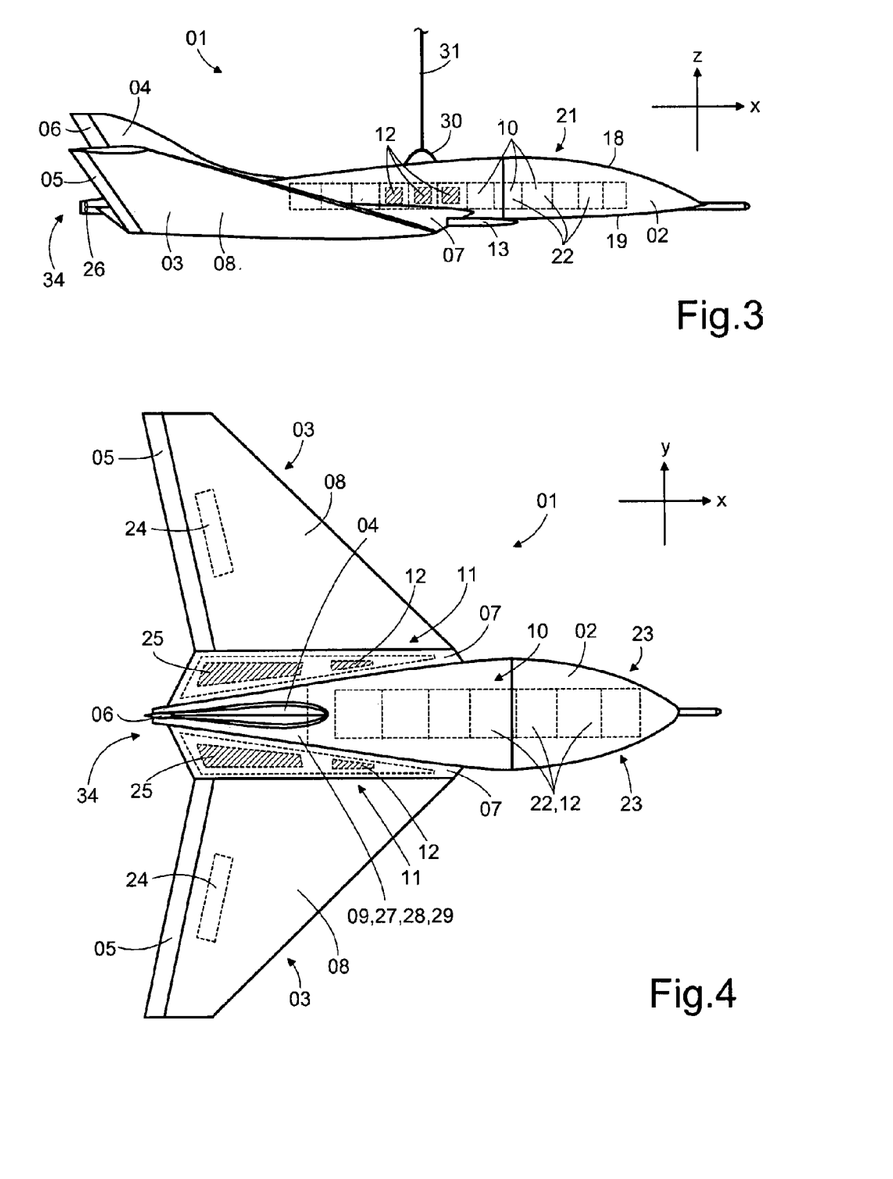
FIG. 3 is a side view of the towed body.
FIG. 4 is a view from above of the towed body.

FIG. 3 is a side view of the towed body 01 (the reference numerals that are not mentioned should be taken from the previous figures). A curvature 21 of the upper face 18 of the fuselage 02 can also be seen in the vertical longitudinal plane (x-z plane), whereas the lower face 19 of the fuselage 02 is not curved and runs straight. In addition, a small segment 07 and a large segment 08 are illustrated with the rudder 05 of a wing 03. The tail fin 04 with the rudder 06 can also be seen. The load chamber 10 in the front and middle region of the fuselage 02, the nose boom 14 and a trace gas or aerosol inlet nozzle 13 are shown. In the illustrated embodiment the load chamber 10 is designed to be rectangular and is subdivided into individual segment chambers 22. Various measuring instruments 12 are located in the individual segment chambers 22. A folding propeller 26 can be arranged in the tail 34 of the fuselage 02 to drive a generator to charge the accumulators.

FIG. 4 is a view from above of the towed body 01. A symmetrical curvature 23 is illustrated in the horizontal longitudinal plane (x-y plane) of the fuselage 02. The pointed taper of the fuselage 02 towards its tail 34 can be clearly seen. These two design measures make the towed body 01 more aerodynamic. In the view from above, the design of the small segments 07 and the large segments 08 of the wings 03 can also be clearly seen. Servo drives 24 for the rudders 05 are shown in the large segments 08. The tail fin 04 with the rudder 06 and segmentation in the load chamber 10 and the unit chamber 09 can be seen. The small segments 07 comprise the additional load chambers 11. The view from above clearly shows how the additional load chambers 11 supplement the load chamber 10. Measuring instruments 12 are arranged in the front region of the load chamber 10 in the illustrated embodiment. In this case, some of the measuring instruments are used to navigate the towed body 01 and some measuring instruments are used to record measurement data for scientific or commercial purposes. Additional measuring instruments 12 are located in the front region of the additional load chamber 11. An emergency parachute system 25 is arranged in the rear region of the additional load chamber 11 in the illustrated embodiment. Various units 27 used to control and supply power to the towed body 01 are located in the unit chamber 09 between the two, for example a control device 28 with an autopilot control device with a position-stabilizing gyroscope system and an anti-collision module, as well as a manual control device and a power supply 29 with chargeable accumulators, including a generator which is driven by the folding propeller 26 on the tail of the towed body 01.

Figure 5:
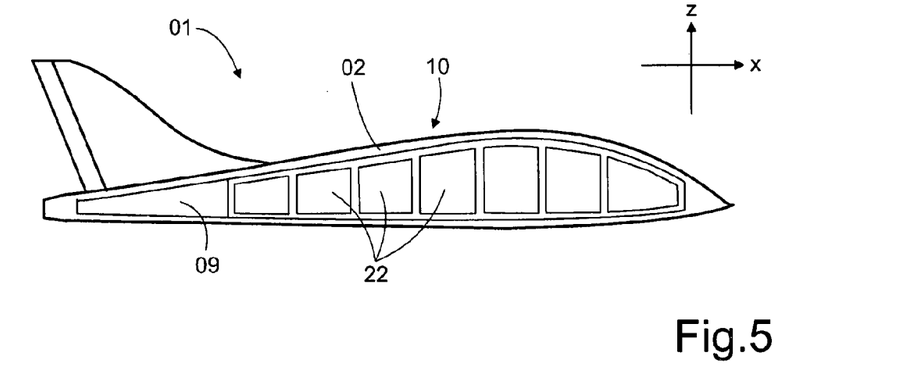
FIG. 5 shows payload segmentation in the towed body.

FIG. 5 shows the towed body 01 again, this time as a schematic longitudinal section (x-z plane). The load chamber 10, which is adapted to the contour of the fuselage 02, can be seen. In this case, the load chamber 10 is subdivided into individual segment chambers 22 which can be installed and removed, and also loaded and unloaded, individually. The unit chamber 09 is attached to the load chamber 10.

The towed body 01 according to the invention may, for example, have the following technical dimensions:
Length of fuselage 3,000 mm
Wingspan 2,800 mm
Maximum fuselage height 289 mm
Maximum fuselage width 446 mm
Total weight 150 kg
Measuring instrument load capacity 90 kg
Load chamber volume 90 dm$^3$
Maximum length of towing cable 4,000 m While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 01 towed body
02 fuselage
03 wing
04 tail fin
05 rudder position control, longitudinal axis, transverse axis of 01
06 rudder position control, vertical axis of 01
07 small segment of 03
08 large segment of 03
09 unit chamber
10 load chamber
11 additional load chamber
12 measuring instrument 13 trace gas and/or aerosol inlet nozzle
14 nose boom
15 triangular transverse plane of 02
16 upper corner of 15
17 lower corner of 15
18 upper face of 02
19 lower face of 02
20 bend in 03
21 curvature of 18, vertical plane
22 segment chamber
23 curvature of 18, horizontal plane
24 servo drive for 05
25 emergency parachute system
26 propeller on 34
27 unit
28 control device (with autopilot control device with gyroscope system and anti-collision module and manual control device)
29 power supply (with accumulators and generator)
30 detachable coupling for 31
31 towing cable
32 transmission and receiving device
33 bending line between 07, 08
34 tail of 02

The invention claimed is:

1. An aerodynamically shaped, active towed body, which is towable through the air using a towing cable by a powered aircraft, the towed body comprising:
a fuselage curved along its vertical and horizontal longitudinal planes, the fuselage having a unit chamber and a load chamber, a transverse plane of the fuselage being triangular, two upper corners being located on an upper face of the fuselage and a lower corner being located on a lower face of the fuselage, and the vertical longitudinal plane of the fuselage only being curved on the upper face and running straight on the lower face;
at least one power supply and one control device disposed in the unit chamber,
two wings arranged at a rear region of the fuselage, each of the two wings being subdivided into a small and a large segment, the small segment pointing downwards and being attached to the fuselage in a region of the lower corner and the large segment pointing upwards and being attached to the small segment, each of the small segments comprising an additional load chamber;
a tail fin;
rudders that are each adjustable by the control device; and
a coupling for the towing cable.

2. The towed body according to claim 1, wherein the rudders include a first rudder configured to provide position control around a longitudinal axis and a transverse axis of the towed body disposed in each of the wings and a second rudder configured to provide position control around a vertical axis of the towed body disposed in the tail fin.

3. The towed body according to claim 1, wherein the control device comprises an autopilot control device and a manual control device, the autopilot control device comprising a position-stabilizing gyroscope system and an anti-collision module.

4. The towed body according to claim 1, wherein the wings and the unit chamber are arranged in the rear region of the towed body and the load chamber is arranged in the middle and front region of the towed body.

5. The towed body according to claim 1, wherein the load chamber in the fuselage comprises individually removable segment chambers which are loadable with variable payloads.

6. The towed body according to claim 1, wherein the upper corners and the lower corner of the fuselage are rounded.

7. The towed body according to claim 1, wherein the coupling for the towing cable is arranged in the middle of the fuselage and a nose boom is arranged at the tip of the fuselage, at least one measuring instrument and/or a transmission and receiving device being arranged in the nose boom and being configured to provide a wireless connection with the powered aircraft and/or with a ground or water-based receiving and transmitting station.

8. The towed body according to claim 1, wherein various measuring instruments and/or transmission and receiving devices are arranged in the load chamber in the fuselage and in the additional load chamber in the small segment of each of the wings.

9. The towed body according to claim 1, further comprising measuring instruments configured to provide maneuvering, detecting obstacles in towing mode, stabilizing the towed body and obtaining measurement data for research-oriented and/or commercial purposes, the measuring instruments being disposed in a nose boom, or in the load chamber in the fuselage and in the additional load chamber in the small segment of each of the wings.

10. The towed body according to claim 8, wherein trace gas and/or aerosol inlet nozzles of the measuring instruments are arranged in the additional load chambers in the small segments.

11. The towed body according to claim 7, wherein the measuring instruments at least comprise a forward-facing infrared camera system, a video camera system, a laser-assisted distance measurement system, a radar-assisted altitude measurement system, a satellite-assisted positioning system and/or a meteorological measurement system.

12. The towed body according to claim 1, wherein the at least one power supply at least comprises accumulators and a generator.

13. The towed body according to claim 12, wherein the generator is a brushless generator with an external rotor in the form of a folding propeller arranged on the tail of the fuselage, the propeller being driven by air flow in towing mode.

14. The towed body according to claim 12, wherein the accumulators are lithium polymer accumulators.

15. The towed body according to claim 1, wherein an emergency parachute system is disposed in the fuselage.

* * * * *